United States Patent [19]

Barbe et al.

[11] Patent Number: 4,774,845
[45] Date of Patent: Oct. 4, 1988

[54] METHOD AND DEVICE FOR MEASURING THE TORQUE TRANSMITTED BY A SHAFT SUBJECTED TO TEMPERATURE VARIATIONS

[75] Inventors: Roger H. L. Barbe, Jurançon; Alain M. Dufau, Billere; Edgar H. Haehner, Bizanos, all of France

[73] Assignee: Turbomeca, France

[21] Appl. No.: 900,368

[22] Filed: Aug. 26, 1986

[30] Foreign Application Priority Data

Mar. 12, 1986 [FR] France ................ 86 03503

[51] Int. Cl.[4] .................................... G01L 3/10
[52] U.S. Cl. .................................... 73/862.34
[58] Field of Search .................... 73/862.34

[56] References Cited

U.S. PATENT DOCUMENTS

| | | | |
|---|---|---|---|
| 3,258,961 | 7/1966 | Van Manen | 73/862.34 |
| 4,444,063 | 4/1984 | Snowden et al. | 73/862.34 |
| 4,602,515 | 7/1986 | Eichenlaub | 73/862.34 |

Primary Examiner—Charles A. Ruehl
Attorney, Agent, or Firm—McGlew and Tuttle

[57] ABSTRACT

According to this method the linear expansion ($\Delta L$) of a reference shaft is measured with reference to that of the power shaft. The linear expansion of the reference shaft ($R_3$) is converted into a movement of rotation of an annular phonic wheel ($B_3$) by means of the free end (J) of this shaft engaged in a helical groove in the inner surface of the annular wheel ($B_3$).

9 Claims, 2 Drawing Sheets

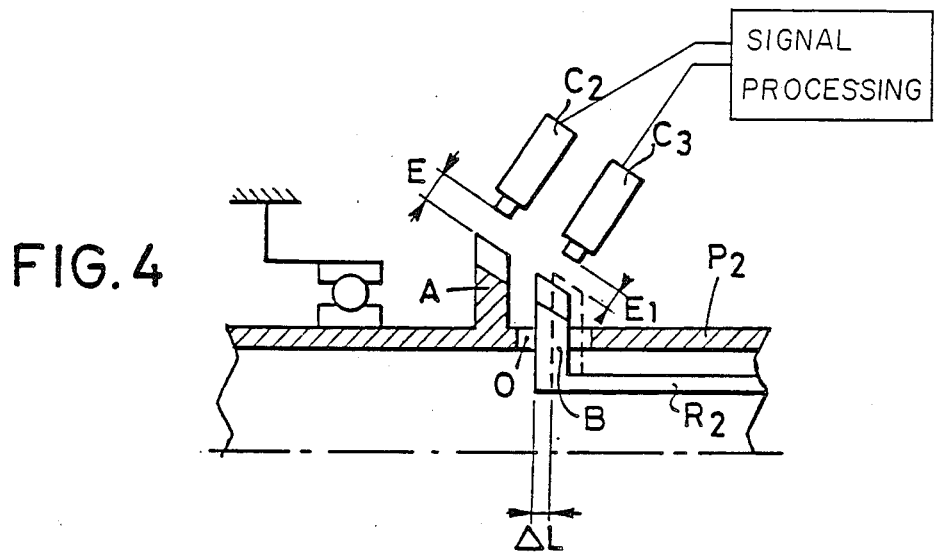
FIG. 4
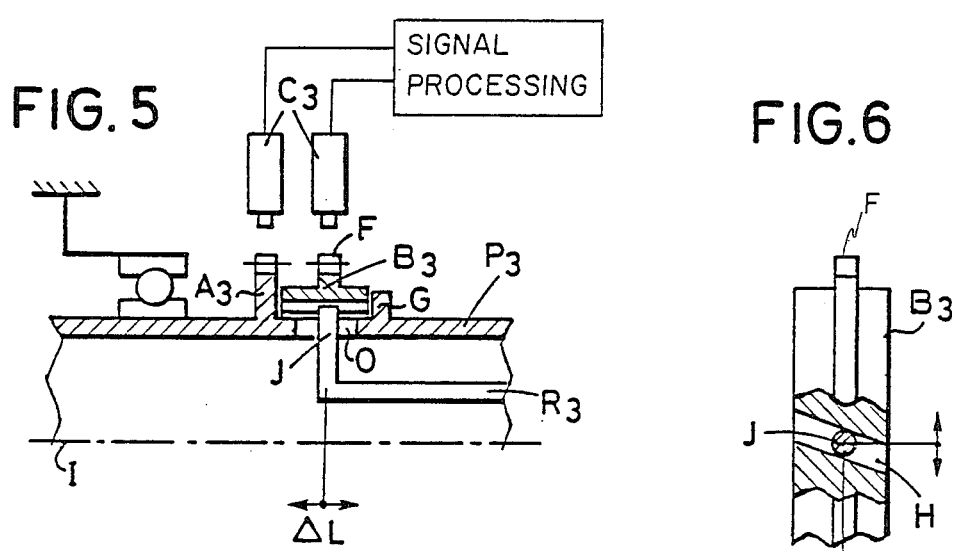
FIG. 5
FIG. 6
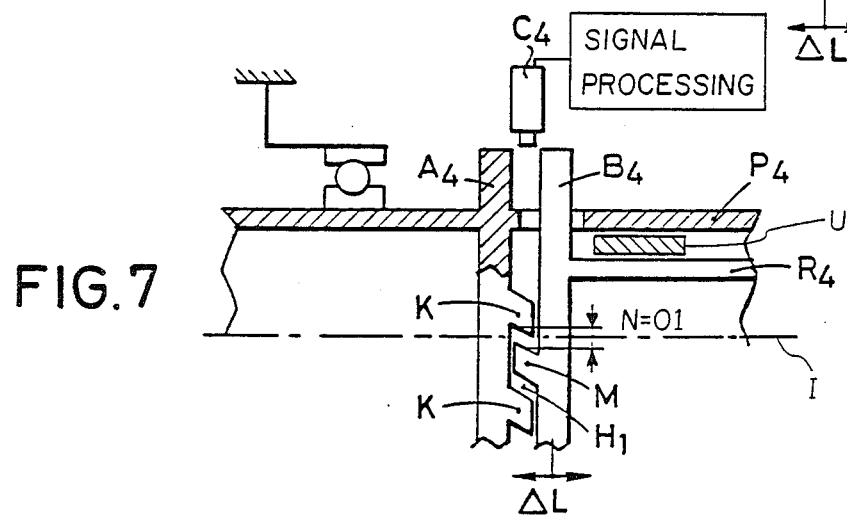
FIG. 7

METHOD AND DEVICE FOR MEASURING THE TORQUE TRANSMITTED BY A SHAFT SUBJECTED TO TEMPERATURE VARIATIONS

FIELD AND BACKGROUND OF THE INVENTION

The present invention relates to a device for measuring the torque delivery by a turbine machine and in particular a turbine engine at the input of the transmission box of a helicopter.

Helicopter engines transmit the power to the principal transmission box either at low speed through a speed reducer incorporated in the engine or at high speed which corresponds to that of the shaft line of a free turbine.

In the first case, the torque is usually measured by means of an apparatus incorporated in the speed reducer without encountering particular difficulties.

In the second case, when the rotation of a free turbine is transmitted directly, the shaft which brings the motion to the front is necessarily of great length and consequently deforms under torsion.

There is then usually employed a torque measuring device having a torsion meter which measures this torsional deformation of the shaft which is a function of the torque transmitted.

However, the torsional rigidity of the shaft is related to the value of Young's modulus of the material from which the shaft is made, and the value of Young's modulus is a function of the temperature of the shaft.

When the design of the machine so permits, the shaft is enclosed in such that the temperature is either known or may be controlled, for example by a spraying or a circulation of oil or other fluid.

The temperature of this fluid provides an acceptable image of the temperature of the shaft and can consequently be used as a correction parameter in an electronic data processing system. In the case of a shaft of great length, the latter extends through different regions in which the temperatures depend on a plurality of variables and whose evolutions are difficult to foresee during operation.

Further, if the constructional technology precludes the provision of a circulation of a fluid for homogenizing the temperature of which is the basis of the temperature of the shaft, use is made of a temperature of a static component part which may serve as a basis for the desired correction; however, sufficient precision is not obtained.

A known device employed for measuring the value of the transmitted torque comprises a first phonic or sound wheel fixed on the shaft and a second phonic or sound wheel fixed on the rear end of a shaft termed a "reference shaft" which is parallel to the first shaft, this end of the reference shaft being free while its opposite end, in the vicinity of the engine, is integral with the transmission shaft.

The angular adjustment of the wheels is effected in accordance with the operational requirements of the electronic measuring circuits employed. The initial angular offset between two homologous teeth of the wheels varies as a function of the transmitted torque.

This value of the initial setting and its increase resulting from the torque produce signals at the output of magnetic sensors disposed in the region of the phonic wheels.

This known device does not take into account variations in Young's modulus due to variations in the temperature.

SUMMARY AND OBJECT OF THE INVENTION

An object of the invention is therefore to provide a method and a device for measuring the torque delivered by a power transmission shaft subjected to a torsional deformation, completed by a device for taking into account temperature variations which may affect the Young's modulus of the material from which said shaft is made.

The invention therefore provides a method for measuring the torque transmitted by a long power transmission shaft subjected to temperature variations, in particular between the engine and the transmission box of a helicopter, in which there is measured the angular offset between the transmission shaft and a reference shaft having a coefficient of expansion different from the transmission shaft. The reference shaft is integral with the transmission shaft in the vicinity of the engine and independent from the reference shaft in the vicinity of the transmission case. The differential linear expansion between the transmission shaft and the reference shaft is measured. This measurement is used to correct errors which come about due to the variation of the Young's modulus of the material of the transmission shaft as a function of its temperature. This correction is based on the knowledge that the expansion is a function of the integral of the temperatures to which the transmission shaft is subjected.

According to one manner of carrying out this method, said differential expansion is measured by variation in the airgap between targets respectively integral with the shafts and magnetic sensors associated with these targets.

According to another manner of carrying out the invention, said differential expansion is converted into a rotation of two phonic wheels respectively associated with the shafts.

Another object of the invention is to provide a device for carrying out the aforementioned method.

According to one embodiment of the invention, an apparatus is provided comprising a reference shaft integral with the power shaft at the output of the engine and independent at the input of the transmission box, two phonic whels respectively integral with the shafts in the vicinity of the box and an additional magnetic sensor associated with the phonic wheel integral with the reference shaft, disposed in facing relation to a non-toothed part of the wheel and having an axis parallel to the axis of the shafts and perpendicular to the plane of the wheel, the shafts being made from materials having different coefficients of expansion.

According to another feature, such a sensor is provided associated in the same way with the phonic wheel integral with the power shaft.

According to another embodiment, a reference shaft is provided integral with the power shaft in the vicinity of the engine and independent in the vicinity of the transmission box. Two phonic wheels are provided integral with the respective shafts in the vicinity of the box. Magnetic sensors are associated with the wheels. The surfaces of the teeth of each phonic wheel are parallel and inclined relative to the axis of said shafts and the axes of said sensors are perpendicular to said surfaces, the shafts being made from materials having different coefficients of expansion.

According to yet another embodiment, this device is of the type comprising a reference shaft integral with the power shaft in the vicinity of the engine and independent in the vicinity of the transmission box, two phonic wheels respectively integral with said shafts in the vicinity of the box, and magnetic sensors associated with the phonic wheels. Means are provided for converting the linear expansion of the reference shaft into a movement of rotation of the associated phonic wheel, the shafts being made from materials having different coefficients of expansion.

According to another feature, the means comprise at least one inclined ramp formed on one of the phonic wheels and cooperative with the independent end of the reference shaft.

According to one embodiment, the ramp is a groove formed on the inner surface of an annular phonic wheel freely rotatively mounted on the power shaft, and said independent end of the refernece shaft extends through an opening in the power shaft and is engaged with the groove.

According to a modification, said phonic wheels are parallel and coaxial and said groove is formed on the surface of the wheel associated with the power shaft and is cooperative with a projection of the wheel integral with the reference shaft.

The following description, with reference to the accompanying drawings given by way of non-limiting examples, will explain how the invention can be carried into effect.

IN THE DRAWINGS

FIG. 4 is a diagrammatic view of a modification;

FIG. 5 is a diagrammatic view of another embodiment of the device for carrying out the method according to the invention;

FIG. 6 is a partial view of the helical ramp formed on the wheel integral with the reference shaft, and FIG. 7 is a view of a modification of the device of FIG. 5.

Figure 1:
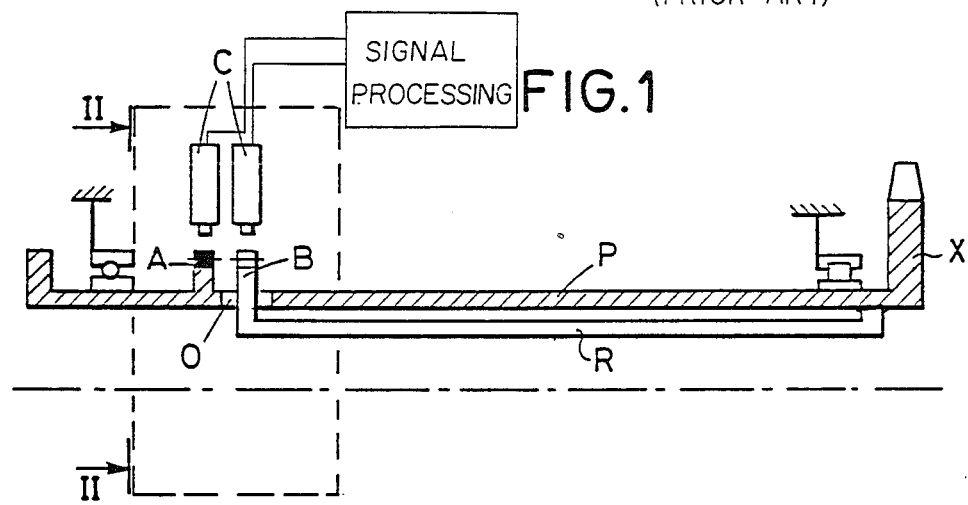
FIG. 1 is a diagrammatic view of a known device for measuring torque by a measurement of the differential torsional deformation of a power shaft and a reference shaft.
Figure 2A:
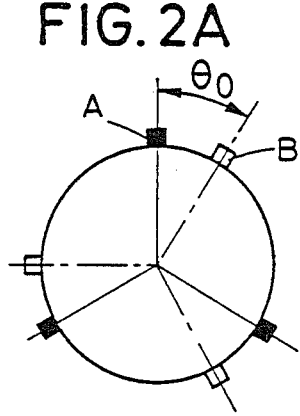
FIGS. 2A and 2B are diagrammatic views in the direction of arrows II—II of FIG. 1 showing the angular offset of the phonic wheels in the device of FIG. 1.
Figure 2B:
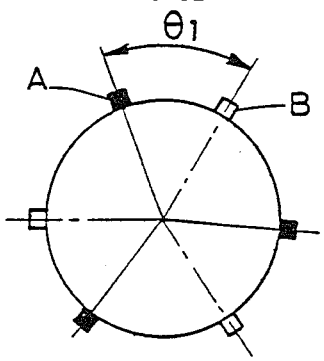

There will first of all be described a device of the prior art for measuring torque transmitted by a power shaft, with reference to FIGS. 1, 2A and 2B.

FIG. 1 shows diagrammatically a hollow power transmission shaft P having at one end a driven gear pinion X driven by an output element of an engine (not shown).

At its opposite end, the shaft P is drivingly connected to a transmission box (not shown).

In the vicinity of this end, the shaft P carries a phonic wheel A.

A reference shaft R is disposed inside the shaft P to which it is secured by its end in the vicinity of the pinion X, while its opposite end is free and carries a phonic wheel sector B concentric with the wheel A, which extends in a direction parallel to the latter outside the shaft P through an opening O in the latter.

In facing relation to the teeth of the phonic wheels A and B there are disposed magnetic sensors C.

The angular setting of the wheels is effected in accordance with the operational requirements of electronic measuring circuits of known type to which the signals delivered by the sensors are applied.

The angular offset $\theta_0$ of the teeth of the wheels A and B becomes $\theta_1$ when the power shaft P is deformed under torsion as a result of the torque applied between the motor and the transmission box.

The measurement of this deformation gives an image of the torque applied but does not take into account variations in Young's modulus of the material of the shaft P under the effect of the temperature.

In order to overcome this drawback, there is used according to the invention a tubular shaft P as a test body as concerns the temperature. Indeed, its length is a function of the integral of the temperatures to which it is subjected throughout its length. Advantageously, the shaft P is thus used in association with the reference shaft, the latter being made from a material having a coefficient of linear expansion markedly different from that of the power shaft P.

There will therefore occur a measurable differential expansion in the region of the phonic wheels.

Figure 3:
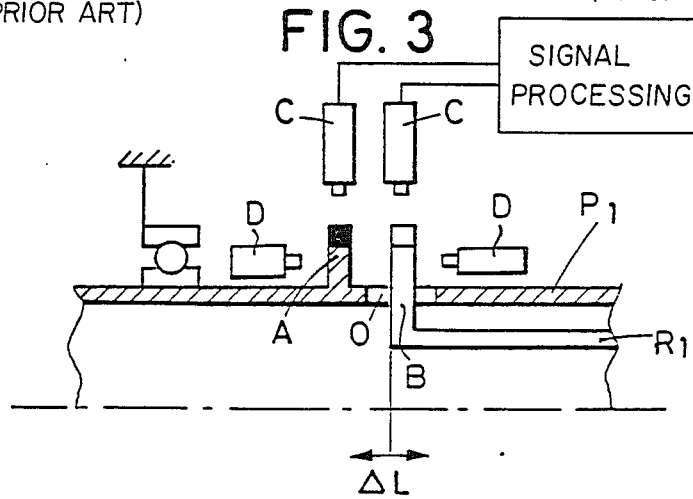
FIG. 3 is a diagrammatic view of a first embodiment of a device for carrying out the method according to the invention.

In a first embodiment of the invention as represented in FIG. 3, similar to the arrangement of FIG. 1, and comprising the shafts $P_1$ and $R_1$ arranged in an identical manner, the shaft $R_1$ has a coefficient of linear expansion which greatly differs from that of the tubular shaft $P_1$ and there are provided two additional sensors D of the magnetic type without contact, known per se, comprising a coil whose inductance is a function of the distance between the sensor and a metallic target.

The target of each sensor is constituted by one of the phonic wheels A or B, each sensor being disposed with its axis parallel to the shafts $P_1$, $R_1$ perpendicular to the wheels and in facing relation to the solid part of the associated wheel.

With the arrangement, there is obtained, in addition to the measurement of the torque given by the sensor C, a measurement of the linear expansion $\Delta L$.

In another embodiment of a device for carrying out the method of this invention, shown in FIG. 4, the shafts $P_2$ and $R_2$ are again arranged in the same way, as are the wheels A and B, but the teeth of the latter have parallel surfaces inclined with respect to the axis of the shafts $P_2$, $R_2$. Sensors $C_2$, $C_3$ are disposed with their axes perpendicular to the inclined surface of the teeth of the phonic wheels the spacing of which varies as a function of the differential linear expansion $\Delta L$, consequently the airgap E of the sensor $C_2$ and the wheel A will remain constant while the airgap $E_1$ of the sensor $C_3$ and the wheel B varies with $\Delta L$ and thus modifies the amplitude of the signal produced by the sensor.

In practice, the proximity of the wheels A and B enables the measurement to be carried out with a single magnetic sensor responsive to the variation in the airgap.

According to another manner of carrying out the method of the invention, the differential linear expansion $\Delta L$ is measured by converting the latter into a movement of rotation.

For this purpose, and with reference to FIG. 5, the shafts $P_3$ and $R_3$ are disposed as in the preceding examples, the power shaft $P_3$ including its phonic wheel $A_3$, while the phonic wheel associated with the reference shaft $R_3$ is formed by an annular wheel $B_3$ having an outer toothed ring F and mounted to be freely rotatable around (or about) the tubular shaft $P_3$ above the opening O of the latter.

Advantageously, the annular phonic wheel $B_3$ is maintained relative to the axial direction on the tubular shaft $P_3$, between the phonic wheel $A_3$ of the tubular shaft $P_3$ and an annular flange G integral with this shaft.

The annular wheel $B_3$ has on its inner surface a grooved portion H (FIG. 6) which is inclined with respect to a central axis I and into which extends a finger member J formed by an end portion of the shaft $R_3$ which is bent laterally.

It will be understood that, when $\Delta L$ varies, the finger member J is displaced and drives the wheel $B_3$ angularly in a corresponding manner about the axis I through the inclined groove H, in front of the sensors $C_3$. In a modification shown in FIG. 7, the phonic wheel $A_4$ associated with the power shaft $P_4$ extends transversely into the tubular shaft and the wheel $B_4$ is integral with the shaft $R_4$, parallel to the wheel $A_4$ and also extends transversely with respect to the shaft $R_4$.

The groove $H_1$ is defined by two parallel teeth K which are inclined with respect to the axis I and project from the side of the wheel $A_4$ facing the wheel $B_4$. Wheel $B_4$ includes a tooth M inclined in a manner corresponding to the inclination of the teeth K and disposed between the latter.

It will be understood that the signals produced by the magnetic sensors associated with the phonic wheels in the various embodiments are processed by suitable electronic circuits. These circuits are conventional and are not part of the invention.

The inclination of the grooves H and $H_1$ is of course proportional to the variation in the temperature. The initial setting and the direction of inclination are established by taking into account the nature of the material of the power and reference shafts.

In the various embodiments, thermal bridges could be provided between the shafts P and R so as to ensure correspondence of their temperatures.

It will be of course also be understood that the method and device according to the invention are applicable just as well in a turbine machine as in the case of a transmission box separate from the engine.

What is claimed is:

1. A method for measuring torque transmitted by a tubular transmission shaft subject to temperature variations, the transmission shaft extending between an engine and a transmission case, a reference shaft is provided within the tubular transmission shaft integral with the transmission shaft adjacent the engine for rotation with the transmission shaft, the reference shaft extending independently from the transmission shaft toward the transmission case, the reference shaft having a coefficient of expansion different from the coefficient of expansion of the transmission shaft, comprising the steps of: measuring the angular offset between the transmission shaft and the reference shaft, the angular offset measurement being a measurement of torque having a measurement error due to variations of the Young's modulus associated with temperature variations, of the material of the transmission shaft; measuring the differential linear expansion between the transmission shaft and the reference shaft, the measured expansion being a function of the integral of the temperatures to which the transmission shaft is subjected; and, computing the torque transmitted by the transmission shaft based on the angular offset measured and the linear expansion differential measured.

2. The method according to claim 1, wherein the differential expansion is measured by measuring a variation of a gap between targets, the targets being integral with the transmission shaft and reference shaft respectively, using magnetic pickups associated with each of the targets.

3. A method according to claim 1 wherein: said differential linear expansion is measured by transmitting the linear expansion into rotational motion of a phonic wheel and measuring the rotation.

4. An apparatus for measuring torque, comprising: a tubular power transmission shaft subject to temperature variations, the transmission shaft extending between an engine and a transmission case; a reference shaft positioned within the tubular transmission shaft and formed integral with the transmission shaft adjacent the engine so as to rotate with the transmission shaft, the reference shaft extending toward the transmission case independently of the transmission shaft, the reference shaft having a coefficient of expansion different from the coefficient of expansion of the transmission shaft; angular offset sensor means, for detecting the angular offset between the transmission shaft and the reference shaft; and, differential linear expansion offset means for measuring the differential linear expansion between the transmission shaft and the reference shaft.

5. An apparatus for measuring torque according to claim 4 wherein: said means for measuring the angular offset and said means for measuring the differential linear expansion include a first phonic wheel connected to said transmission shaft; a second phonic wheel connected to said reference shaft, said first and second phonic wheel having teeth, the end surfaces of the phonic wheel teeth being parallel and at an angle relative to a central axis of the transmission shaft and reference shaft; a first magnetic pickup perpendicular to the end surfaces of the teeth of said first phonic wheel; and, a second magnetic pickup perpendicular to the end surfaces of the teeth of said second phonic wheel, the magnetic pickups each detecting angular movement and linear movement of the phonic wheels associated with the reference shaft and transmission shaft.

6. An apparatus according to claim 4, wherein: said means for measuring the differential linear expansion includes a phonic wheel associated with said reference shaft and means for converting the linear expansion motion of the reference shaft into rotational motion of the associated phonic wheel.

7. An apparatus according to claim 6, wherein: said means for converting the linear expansion motion of the reference shaft into rotational motion of the phonic wheel includes an inclined slot in said phonic wheel, and a finger member fixed to said reference shaft, the linear motion of the reference shaft causing the finger member to move within the slot thereby causing rotation of the phonic wheel.

8. An apparatus according to claim 7, wherein: said phonic wheel is an annular wheel positioned about the transmission shaft, said slot is formed on an inner surface of the annular phonic wheel and said finger member extends through an opening in the transmission shaft so as to engage said slot.

9. An apparatus according to claim 4, wherein: a thermal bridge is positioned between said transmission shaft and said reference shaft.

* * * * *